United States Patent
Abdo et al.

(10) Patent No.: US 12,390,044 B2
(45) Date of Patent: Aug. 19, 2025

(54) ADAPTIVE SERVICE UNIT OF A BEVERAGE MACHINE

(71) Applicant: SOCIETE DES PRODUITS NESTLE S.A., Vevey (CH)

(72) Inventors: Samer Abdo, Lonay (CH); Michael Fournier, Veysonnaz (CH); Bertrand Guyon, Pontarlier (FR); Marco Magatti, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 1133 days.

(21) Appl. No.: 17/280,287

(22) PCT Filed: Sep. 27, 2019

(86) PCT No.: PCT/EP2019/076137
§ 371 (c)(1),
(2) Date: Mar. 26, 2021

(87) PCT Pub. No.: WO2020/064982
PCT Pub. Date: Apr. 2, 2020

(65) Prior Publication Data
US 2022/0031112 A1 Feb. 3, 2022

(30) Foreign Application Priority Data
Sep. 27, 2018 (EP) .................... 18197094

(51) Int. Cl.
*A47J 31/44* (2006.01)
*A47J 31/46* (2006.01)

(52) U.S. Cl.
CPC ........... *A47J 31/4403* (2013.01); *A47J 31/46* (2013.01)

(58) Field of Classification Search
CPC .............. A47J 31/4403; A47J 31/46
See application file for complete search history.

(56) References Cited

U.S. PATENT DOCUMENTS

| | | | |
|---|---|---|---|
| 3,613,566 A | 10/1971 | Lloyd et al. | |
| 7,165,488 B2 * | 1/2007 | Bragg | A47J 31/3676 99/302 R |

(Continued)

FOREIGN PATENT DOCUMENTS

| | | |
|---|---|---|
| CN | 102406448 A | 4/2012 |
| CN | 102791172 A | 11/2012 |

(Continued)

OTHER PUBLICATIONS

Russian Office Action for Appl No. 2021111008/03 dated Jan. 19, 2023.

(Continued)

*Primary Examiner* — Sean M Michalski
(74) *Attorney, Agent, or Firm* — K&L Gates LLP (57) ABSTRACT

A machine (1) for preparing a beverage has: a body (1') comprising a seat (4) and a beverage processing line (1", 1'") extending from a liquid inlet (1") to a beverage dispenser (1'"); and a service unit (10) that is removably received in or on the seat (4) and that comprises a foot part (11) and a recipient part (12) removably received in or on the foot part (11) so as to be supported thereby. The foot part (11) has a bottom face (11') configured to rest on an external horizontal support surface (100) when the service unit (10) is removed from the seat (4). When the recipient part (12) is received in or on the foot part (11), the recipient part (12) is movable relative to the foot part (11) from a first stable position when the service unit (10) rests on the external horizontal support surface (100) to a second stable position when the service unit (10) is received in or on the seat (4), and vice versa.

20 Claims, 4 Drawing Sheets

(56) References Cited

U.S. PATENT DOCUMENTS

| | | | | |
|---|---|---|---|---|
| 8,978,542 | B2* | 3/2015 | Talon | A47J 31/4403 99/301 |
| 9,510,707 | B2* | 12/2016 | Mori | A47J 31/4403 |
| 9,668,608 | B2* | 6/2017 | Mori | A47J 31/36 |
| 9,675,205 | B2* | 6/2017 | Cahen | F16M 13/022 |
| D831,398 | S* | 10/2018 | Cahen | D7/311 |
| D832,019 | S* | 10/2018 | Cahen | D7/311 |
| D836,371 | S* | 12/2018 | Cahen | D7/311 |
| 2008/0006159 | A1* | 1/2008 | Fischer | A47J 31/4467 99/289 R |
| 2010/0236414 | A1 | 9/2010 | Frigeri et al. | |
| 2011/0265658 | A1* | 11/2011 | Talon | A47J 31/407 99/289 R |
| 2012/0285331 | A1* | 11/2012 | Mori | A47J 31/44 99/285 |
| 2012/0285966 | A1* | 11/2012 | Mori | A47J 31/36 220/315 |
| 2013/0213238 | A1* | 8/2013 | Cahen | A47J 31/4485 99/289 R |
| 2013/0318928 | A1* | 12/2013 | Dakis | B65B 1/366 141/1 |
| 2014/0272049 | A1* | 9/2014 | Azzano | A47J 31/4403 426/433 |
| 2014/0352545 | A1 | 12/2014 | Cahen et al. | |
| 2015/0075387 | A1* | 3/2015 | Lee | A47J 31/46 99/289 R |

FOREIGN PATENT DOCUMENTS

| | | |
|---|---|---|
| CN | 107105930 A | 8/2017 |
| CN | 107920684 A | 4/2018 |
| WO | 2014118725 A2 | 8/2014 |
| WO | 2014135438 A1 | 9/2014 |
| WO | 2016156367 A1 | 10/2016 |
| WO | 2017037215 A1 | 3/2017 |
| WO | 2017118713 | 7/2017 |

OTHER PUBLICATIONS

Japanese Office Action for Appl No. JP2021-516495 dated May 30, 2023.
Chinese Office Action for Chinese Appl No. 2019800585622 dated Aug. 29, 2022.

\* cited by examiner

ADAPTIVE SERVICE UNIT OF A BEVERAGE MACHINE

CROSS REFERENCE TO RELATED APPLICATIONS

The present application is a National Stage of International Application No. PCT/EP2019/076137, filed on Sep. 27, 2019, which claims priority to European Patent Application No. 18197094.8, filed on Sep. 27, 2018, the entire contents of which are being incorporated herein by reference.

FIELD OF THE INVENTION

The field of the invention pertains to beverage preparation machines, e.g. to machines using capsules of an ingredient of the beverage to be prepared, the machine having a removable unit, e.g. an ingredient supply or collecting unit, that has an adaptive arrangement.

For the purpose of the present description, a "beverage" is meant to include any human-consumable liquid substance, such as tea, coffee, hot or cold chocolate, milk, soup, baby food, etc. . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

The machine may include a mixing unit, such as a unit operating with an ingredient-containing capsule that that is combined in the mixing unit with a liquid, e.g. water, to form a beverage. For examples, mixing units have been developed to facilitate insertion of a "fresh" capsule and removal of the capsule upon use. Typically, the mixing unit comprise two parts relatively movable from a configuration for inserting/removing a capsule to a configuration for brewing the ingredient in the capsule. The actuation of the movable part of the mixing unit may be manual as disclosed in WO 2009/043630, WO 01/15581, WO 02/43541, WO 2010/015427, WO 2010/128109, WO 2011/144719 and WO 2012/032019. Various handle configurations are disclosed in EP 1867260, WO 2005/004683, WO2007/135136, WO 2008/138710, WO 2009/074550, WO 2009/074553, WO 2009/074555, WO 2009/074557, WO 2009/074559, WO 2010/037806, WO 2011/042400, WO 2011/042401 and WO 2011/144720. Integrations of such arrangements into beverage machines are disclosed in WO 2009/074550, WO2011/144719, EP2014195046, EP2014195048 and EP2014195067. The actuation of the movable part of the mixing unit may be motorized, as for example disclosed in EP 1 767 129, WO 2012/025258, WO 2012/025259 and WO 2013/127476.

A beverage machine typically includes a housing containing a beverage processing module and a water tank in fluid communication with the beverage processing module. Examples of such beverage machines are disclosed in EP 1 208 782, EP 1 267 687, EP 1 686 879, EP 1 731 065, EP 1 829 469, EP 1 864 598, EP 1 865 815, EP 1 867 260, EP 1 878 368, EP 2 222 210, EP 2 222 211, EP 2 222 212, EP 2 227 121, EP 2 227 122, U.S. 2008/0006159, U.S. Pat. No. 7,165,488, WO 2007/111884, WO 2009/074553, WO 2010/015427, WO 2011/089210 and WO 2012/055767. Usually the water tank is removable to be refilled by a user when empty. Some systems include a continuous water supply by connecting the beverage machine to the city water distribution network.

SUMMARY OF THE INVENTION

The invention relates to a machine for preparing a beverage. The beverage preparation machine can be an in-home or out of home machine. The machine may be for the preparation of coffee, tea, chocolate, cacao, milk, soup, baby food, etc. . . . .

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluent liquid, e.g. water, may be mixed with such ingredient to form the beverage. Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . . In particular, a coffee machine may be configured for dispensing espressos, e.g. an adjustable volume of 20 to 60 ml per portion, and/or for dispensing lungos, e.g. a volume in the range of 70 to 150 ml per portion.

The machine of the invention has a body with a seat and a beverage processing line extending from a liquid inlet to a beverage dispenser.

The liquid inlet may be connected to a source of liquid, e.g. water, such as a machine tank and/or an external liquid supply line, e.g. a domestic water supply line.

The beverage outlet is typically located above a placement location for a beverage recipient, e.g. a cup or a mug.

Examples of processing lines, machine tanks, external liquid supply lines, outlets and their connections can be found in WO 2009/130099, WO 2010/006953, WO 2010/046442, WO 2010/128109, WO 2011/083103, WO 2011/089210, WO 2011/095502, WO 2011/144723, WO 2012/055765, WO 2012/055767, WO 2012/072758, WO 2013/127907, WO 2016/005348, WO 2016/005349, WO 2016/

005350, WO 2016/005351, WO 2017/081055, WO 2017/118713, WO 2018/069266, WO 2018/069268 and EP2228633.

The placement location can be associated with a machine recipient support for supporting such user-recipient under the outlet. The support can be: associated with a drip tray e.g. a drip tray supporting the support; and/or movable relative to the housing vertically under the outlet and/or away from under the outlet for enabling a placement of user-recipients of different heights under the outlet. Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, EP 2014198712, EP 2014198710 and EP 2014198715.

The liquid line can extend via a pump for pumping the liquid and/or a thermal conditioner such as a heater and/or a cooler for thermally conditioning the liquid.

The pump can be arranged for driving the liquid from the liquid inlet to the dispenser, e.g. a solenoid pump (reciprocating piston pump) or a peristaltic pump or a diaphragm pump. Examples of pumps and their incorporation into beverage machines are disclosed in WO 2009/150030, WO 2010/108700, WO 2011/107574, WO 2013/098173 and WO 2018/001750.

The thermal conditioner may be a boiler or a thermoblock or an on demand heater (ODH), for instance an ODH type disclosed in EP 1 253 844, EP 1 380 243, EP 1 809 151, WO 2009/043851, WO 2009/043865 and WO 2011/157675. A cooler may be provided with a Pelletier arrangement or by using a heat pump.

The liquid line may include at least one of: a liquid sensor, e.g. a flowmeter and/or a pressure sensor and/or a temperature sensor, or a sensor of an operational state of the machine. Exemplary sensors and their integration are disclosed in WO 2010/046442, WO 2010/149600, WO 2010/149601, WO 2010/149602, WO 2011/067171, WO 2011/067181, WO 2018/046400 and EP 2228633.

The machine has a service unit that is removably received in or on the seat and that comprises a foot part and a recipient part removably received in or on the foot part so as to be supported thereby. The foot part has a bottom face configured to rest on an external horizontal support surface when the service unit is removed from the seat.

Examples of service units are disclosed in WO 2006/050881, WO 2009/074559, WO 2009/135869, WO 2011/086087, WO 2011/086088, WO 2016/096705, WO 2016/096706, WO 2016/096707, WO 2017/118713 and EP 1867260.

The seat may be delimited by a platform for supporting the service unit in or on the seat and/or for guiding the service unit into or onto the seat.

The recipient part may be configured to store: un-used beverage ingredient and/or beverage liquid and/or cleaning fluid, to be supplied to the beverage processing line; and/or used beverage ingredient (e.g. contained within a used capsule) and/or waste beverage liquid and/or used cleaning fluid, collected from the beverage processing line.

When the recipient part is received in or on the foot part, the recipient part is movable relative to the foot part from a first stable position (when the service unit rests on the external horizontal support surface) to a second stable position (when the service unit is received in or on the seat), and vice versa. It being understood that the first and second stable positions are different.

Hence, the configuration of the service unit can be adapted to meet a desired geometry/shape and/or balance when seated in or on the machine's body and take a different geometry/shape and/or balance (e.g. more stable) for being placed on an external horizontal support surface.

The recipient part can be moved into: its first stable position by gravity force onto the recipient part and/or a biasing element; and/or its second stable position by mechanical resistance of the seat when the recipient part is urged against a body part delimiting the seat while the service unit is being moved into or onto the seat.

When the foot part of the service unit rests on the external horizontal support surface and the recipient part is received in or on the foot part, a first vertical projection of a centre of gravity of the service unit on a plane containing the boundary of the bottom face may be contained within the boundary.

In such a configuration, the service unit may be balanced and stable on the external support surface by itself.

When the service unit is received in or on the seat and the recipient part is received in or on the foot part and the body rests on the external horizontal support surface, a second vertical projection of the centre of gravity of the service unit on the plane is located off the boundary of the bottom face or closer to the boundary than the first vertical projection.

In such a configuration, the service unit may have lesser inherent stability when in or on the seat. In this case, the body can be used to stabilise or further stabilise the (inherently instable or inherently lesser stable) service unit.

The recipient part and the foot part can be articulated and/or translationally connected, when the recipient part is received in or on the foot part.

The recipient part can be pivotally movable relative to the foot part when the recipient part is received in or on the foot part.

The recipient part may be fastened to the foot part when the recipient part is received in or on the foot part. For example, the recipient part is fastened to the foot part by at least one of a bias, spring, hook, lock and friction mechanism.

The recipient part can be fastened to the foot part by a dismantlable bearing arrangement that guides the recipient part and the foot part for their relative movement.

The foot part may have one or more protrusions that are urged into corresponding recesses of the recipient part and/or vice versa. Whether in the foot part or in the recipient part, such protrusion and corresponding recess can be arranged to be relatively movable by translation and/or pivoting to relatively move the foot part and the recipient part. Such protrusion may be formed as a pin and the corresponding recess may formed as a hole, e.g. a blind hole, or a channel or groove.

The recipient part can have a recipient bottom that rests on the foot part in the first stable position and that is at least partly lifted away from the foot part in the second stable position. For instance, the recipient bottom is tilted upwards and/or translated in the second stable position.

The recipient part may contain a removable auxiliary recipient.

Such auxiliary recipient can be configured for collecting solid material and can have a bottom with one or more through openings for allowing the passage of liquid material from the auxiliary recipient to underneath the auxiliary recipient to be collected on a recipient bottom of the recipient part.

Such auxiliary recipient may be fitted with a handle for seizing the auxiliary recipient to remove the auxiliary recipient from the recipient part.

The service unit can be releasably fastened in the seat, such as fastened by at least one of a bias, spring, hook, lock and friction mechanism, e.g. by a resilient and/or magnetically configured connection arrangement. For instance, the service unit includes a handle that forms a service unit connector of such connection arrangement.

The foot part may include an upright wall portion that forms part of an outside machine housing, such as an upright wall portion covering the seat, when the service unit is received in or on the seat. The upright wall portion may delimit a cavity, such as a cavity between an inner upright wall portion and an outer upright wall portion. For instance, the cavity contains an electric device, e.g. a signal or light emitter and/or a signal or light sensor, which electric device has a wired or wireless connection to a control unit of the body.

For example, the machine (in particular the foot) integrates detection arrangement integrated in the manner taught in WO 2018/046400.

When the machine is provided with the abovementioned machine tank, such tank can be at least one of:
removably received in or on the seat when connected to the liquid inlet, optionally the machine tank being insertable into or onto the seat and removable from the seat providing the service unit has been removed from the seat;
fitted with a lid movable or removable for filling the machine tank with liquid; and
provided with an outlet connector that is connectible to the liquid inlet, the outlet connector and the liquid inlet having for instance a generally horizontal connection and disconnection direction.

Examples of machine tanks are mentioned in the above cited documents.

The liquid dispenser can have a beverage outlet, such as a beverage outlet fixed to a dispensing head.

The liquid dispenser may have a dispensing head that can move inwards into the body for storage and outwards out of the body for dispensing, such as a dispensing head bearing a beverage outlet.

Examples of dispensing heads are disclosed in WO 2009/043630, WO 2017/037212, WO 2017/037215, PCT/EP18/064138 and PCT/EP18/064141

The liquid dispenser can include a control unit for controlling the beverage processing line.

Examples of control units and their integration are disclosed in WO 2009/043865 and WO 2009/130099.

The liquid dispenser may incorporate a user-interface connected to a control unit for controlling the beverage processing line.

Examples of such user-interface integration are disclosed in WO 2017/037215, WO 2018/046400, PCT/EP18/064138, PCT/EP18/064141 and PCT/EP18/064145.

The beverage processing line can integrate a beverage mixing unit in fluid communication with the liquid inlet and the beverage dispenser. For instance, the beverage mixing unit has a mixing cavity and an ingredient inlet channel for handling an ingredient to be mixed with liquid. Mixing units are known per se and can be of the above mentioned type.

The ingredient inlet channel may have an ingredient gate that has a configuration that allows an ingredient to travel to the mixing cavity and a configuration that prevents an ingredient to travel to the mixing cavity.

Examples of inlet channels fitted with an ingredient gate are disclosed in WO 2012/126971, WO 2014/056641, WO 2014/056642, WO 2014/056730 and WO 2015/086371.

The ingredient inlet channel and the mixing cavity may be configured for handling a preportioned ingredient supplied within an ingredient capsule.

Ingredient capsules are known per se and can be of the above mentioned type.

For instance, the gate includes an obstacle, such as one or more sliding and/or swing doors, deployed across the ingredient inlet channel in the closed configuration and at least partly retracted from across the ingredient inlet channel in the open configuration.

The gate can be movable, such as pivotable and/or translatable, between a position obstructing the ingredient inlet channel for preventing a passage of the ingredient along the ingredient inlet channel and a position clearing the ingredient inlet channel for allowing a passage of the ingredient along the ingredient inlet channel.

For example, the obstacle forms an ingredient holder, e.g. an ingredient capsule holder, for holding the ingredient prior to the transfer to the liquid line.

The capsule holder may have: a capsule holding configuration for holding an ingredient capsule away from the liquid line; and a capsule releasing configuration for releasing the capsule in or into the ingredient inlet channel towards the liquid line.

Immediately after releasing a capsule to the mixing cavity, the holder may be passed from the releasing configuration to the holding configuration so that the ingredient inlet channel is opened only when needed to release a capsule.

The holder can have a shape complementary to a shape of the capsule.

The holder may have an actuator for passing from the holding to the releasing configuration and vice versa, e.g. an actuator controlled by a or the control unit.

Details of suitable capsule holders are disclosed in WO 2012/126971, WO 2014/056641, WO 2014/056642 and WO 2015/086371.

The holder may have a capsule sensor for sensing a presence of a capsule on the capsule holder and optionally sensing a type of the capsule. The capsule holder can be controlled by the control unit to automatically release a sensed capsule to the mixing cavity. When a particular type of capsule is identified, the control unit may adapt the control of the preparation unit of the beverage according to the identified type.

Details of suitable capsule sensing are disclosed in WO 2012/123440, WO 2014/147128, PCT/EP15/060555, PCT/EP15/060561, PCT/EP15/060567, PCT/EP15/065415 and PCT/EP15/065535.

A suitable mixing cavity may be formed by first and second parts that are relatively moved manually or by a motor e.g. as disclosed in EP 1767129, WO 2009/043630, WO 2012/025258, WO 2012/025259, WO 2013/127476 and WO 2014/056641 and in the references cited above.

Such ingredient capsule may be of the type described above under the title "Field of the Invention" and/or the capsule may include an ingredient described under the same title.

The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food.

Self-opening capsules are for instance disclosed in CH 605 293 and WO 03/059778.

The opening of capsules by a machine's piercing elements of a plate is for example disclosed in EP 512 470 and EP 2 068 684.

Examples of suitable mixing cavities are disclosed in WO 2008/037642 and WO 2013/026843.

A flavoured beverage may be prepared by circulating (e.g. by means of a pump) a carrier liquid, such as water, into the capsule to flavour the liquid by exposure to a flavouring ingredient held in the capsule, e.g. along an extraction direction that may be generally parallel to the direction of relative movement of first and second parts delimiting an exemplary embodiment of the mixing cavity.

When closed capsules are used, the first and second parts may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein.

BRIEF DESCRIPTION OF THE DRAWINGS

The invention will now be described with reference to the schematic drawings, wherein.

DETAILED DESCRIPTION

FIGS. 1 to 12 illustrate an exemplary embodiment of a beverage machine 1 according to the invention and parts of such machine 1.

Machine 1 is configured for preparing a beverage, such as a beverage prepared from an ingredient selected from at least one of: coffee; tea; chocolate; cocoa; milk; soup; and baby food.

Machine 1 has a body 1' comprising a seat 4 and a beverage processing line 1",1''' extending from a liquid inlet 1" to a beverage dispenser 1'''. See FIGS. 1 to 3.

Liquid inlet 1" may be connected to a source of liquid, e.g. water, such as a machine tank 2 and/or an external liquid supply line. See FIGS. 3 and 4.

Liquid line 1",1''' can extend via a pump 3 and/or a thermal conditioner 3' such as a heater and/or a cooler. See FIGS. 2 and 3.

Machine 1 has a service unit 10 that is removably received in or on seat 4. Unit 10 comprises a foot part and a recipient part 12 removably received in or on foot part 11 so as to be supported thereby. Foot part 11 has a bottom face 11' configured to rest on an external horizontal support surface 100 when service unit 10 is removed from the seat 4. See FIGS. 1 to 4.

Seat 4 may be delimited by a platform 4a for supporting service unit 10 in or on seat 4 and/or for guiding service unit 10 into or onto the seat 4. See FIGS. 2 and 4.

The recipient part can be configured to store un-used beverage ingredient and/or beverage liquid and/or cleaning fluid, to be supplied to the beverage processing line.

Recipient part 12 can be configured to store used beverage ingredient and/or waste beverage liquid and/or used cleaning fluid, collected from the beverage processing line 1",1'''. See FIG. 3.

When recipient part 12 is received in or on foot part 11, recipient part 12 is movable relative to foot part 11 from a first stable position when the service unit 10 rests on external horizontal support surface 100 to a second stable position when service unit 10 is received in or on seat 4, and vice versa. It being understood that the first and second stable positions are different. See FIGS. 1 to 4.

Recipient part 12 can be moved into its first stable position by gravity force onto recipient part 12 and/or a biasing element. See FIGS. 5 and 6.

Recipient part 12 may be moved into its second stable position by mechanical resistance of seat 4 when recipient part 12 is urged against a body part 4" delimiting seat 4 while service unit 10 is being moved into or onto seat 4. See FIGS. 3 and 4.

When foot part 11 of service unit 10 rests on external horizontal support surface 100 and recipient part 12 is received in or on foot part 11, a first vertical projection G1 of a centre of gravity G of service unit 10 on a plane P containing boundary 11" of bottom face 11' can be contained within boundary 11". See FIG. 6.

When service unit 10 is received in or on seat 4 and recipient part 12 is received in or on foot part 11 and body 1' rests on external horizontal support surface 100, a second vertical projection G2 of centre of gravity G of service unit 10 on plane P can be located off boundary 11" of bottom face 11' or closer to boundary 11" than first vertical projection G1. See FIG. 5.

Recipient part 12 and foot part 11 may be articulated and/or translationally connected, when recipient part 12 is received in or on foot part 11. See FIGS. 3 to 6.

Recipient part 12 may be pivotally movable relative to foot part 11 when recipient part 12 is received in or on foot part 11.

Recipient part 12 can be fastened to foot part 11 when recipient part 12 is received in or on foot part 11. For instance, recipient part 12 is fastened to foot part 11 by at least one of a bias, spring, hook, lock and friction mechanism. See FIGS. 5 to 12.

Recipient part 12 can be fastened to foot part 11 by a dismantlable bearing arrangement that guides recipient part 12 and foot part 11 for their relative movement. See FIGS. 5 to 8 as well as 11 and 12.

Foot part 11 may include one or more protrusions 11a that are urged into corresponding recesses 12a of recipient part 12 and/or vice versa. See FIGS. 11 and 12.

Whether in foot par 11 or in recipient part 12, such protrusion 11a and corresponding recess 12a may be arranged to be relatively movable by translation and/or pivoting to relatively move foot part 11 and recipient part 12. See FIGS. 5 to 8 as well as 11 and 12.

Such a protrusion 11a can be formed as a pin and the corresponding recess can be formed as a hole 12a, e.g. a blind hole, or a channel or groove. See FIGS. 11 and 12.

Recipient part 12 may have a recipient bottom 12b that rests on foot part 11 in the first stable position and that is at least partly lifted away from foot part 11 in the second stable position. Recipient bottom 12b may be tilted upwards and/or translated in the second stable position. See FIGS. 3 to 6.

Recipient part 12 may contain a removable auxiliary recipient 12c. See FIGS. 2 to 10.

Auxiliary recipient 12c may be configured for collecting solid material and may have a bottom 12c' with one or more through openings for allowing the passage of liquid material from auxiliary recipient 12c to underneath auxiliary recipient 12c to be collected on a recipient bottom 12b of recipient part 12. See FIG. 3.

Auxiliary recipient 12c can be fitted with a handle 12c" for seizing auxiliary recipient 12c to remove auxiliary recipient 12c from recipient part 12. See FIGS. 5 to 10.

Service unit 10 can be releasably fastened in seat 4, such as fastened by at least one of a bias, spring, hook, lock and friction mechanism, e.g. by a resilient and/or magnetically configured connection arrangement 4'12c". Service unit 10 may include a handle 12c" that forms a service unit connector 12c''' of connection arrangement 4',12c". See FIGS. 3 and 4.

Foot part 11 may have an upright wall portion 11b that forms part of an outside machine housing 1a', such as an upright wall portion 11b covering seat 4, when service unit 10 is received in or on seat 4. Upright wall portion 11b may delimit a cavity 11b', such as a cavity between an inner upright wall portion 11b" and an outer upright wall portion 11b'''. Cavity 11b' can contain an electric device $11b^{IV}$, e.g. a signal or light emitter and/or a signal or light sensor, which electric device $11b^{IV}$ has a wired or wireless connection $11b^{V}$ to a control unit 5 of body 1'. See FIGS. 2 to 12.

Machine 1 may include machine tank 2. See FIGS. 2 to 4.

Machine tank 2 may be removably received in or on seat 4 when connected to liquid inlet 1". For instance, tank is insertable into or onto seat 4 and removable from seat 4 providing service unit 10 has been removed from seat 4. See FIGS. 2 to 4.

Machine tank 2 can be fitted with a lid 2' movable or removable for filling machine tank 2 with liquid. See FIG. 3.

Machine tank 2 may be provided with an outlet connector that is connectible to liquid inlet 1". For instance, the outlet connector and liquid inlet 1" have a generally horizontal connection and disconnection direction. See FIG. 3.

Liquid dispenser 1''' may include a beverage outlet $1^{iv}$. Beverage outlet $1^{iv}$ can be fixed to a dispensing head.

Liquid dispenser 1''' can have a dispensing head that can move inwards into body 1' for storage and outwards out of body 1' for dispensing. Dispensing head may bear a beverage outlet $1^{iv}$.

Liquid dispenser 1''' can comprise a control unit 5 for controlling beverage processing line 1",1'''.

Liquid dispenser 1''' may include a user-interface 50 connected to a control unit 5 for controlling beverage processing line 1",1'''.

Figures 1, 2:
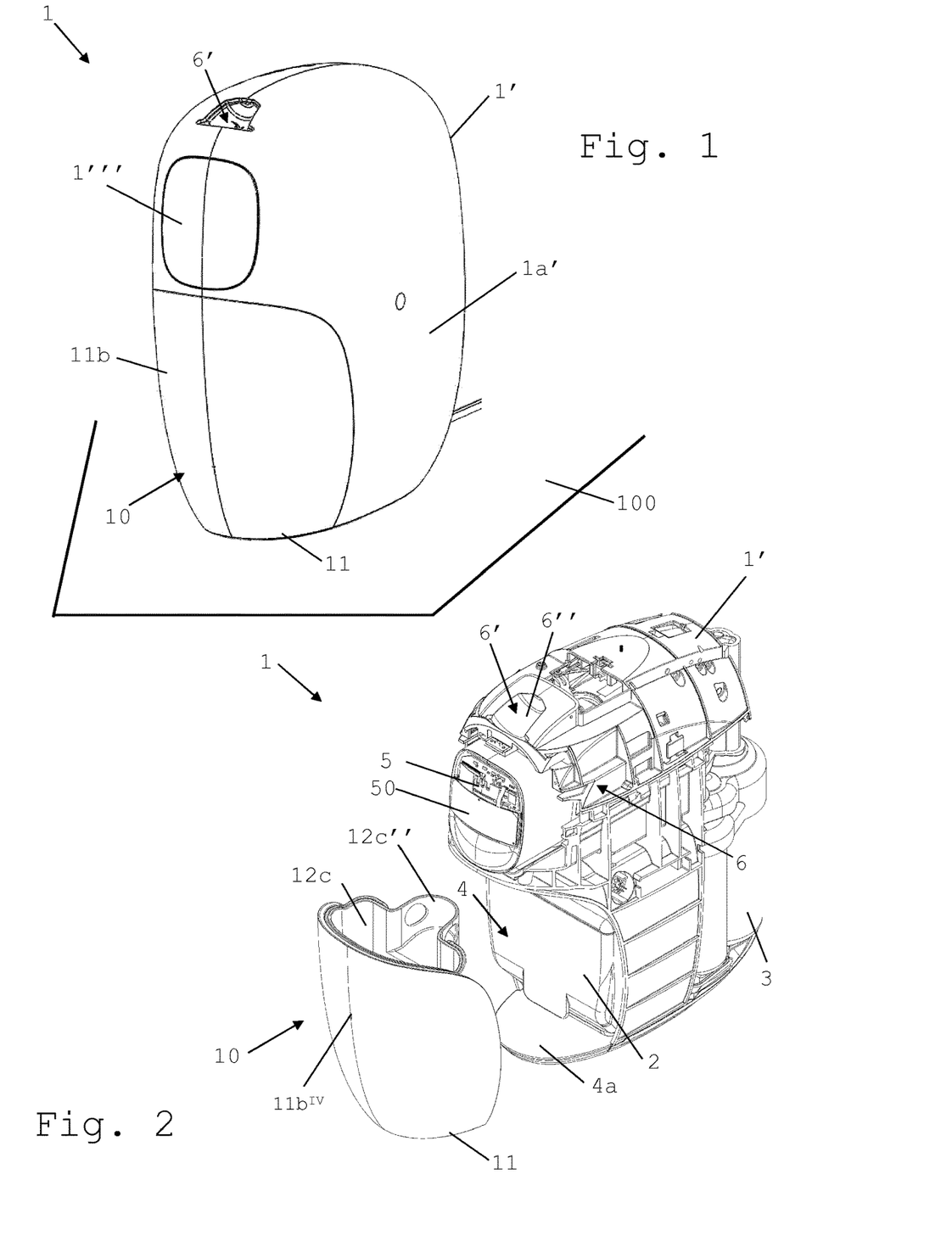
FIG. 1 is a perspective view from the side of a machine having a body and a service unit removably received in a corresponding seat of the body according to the invention.
FIG. 2 shows a perspective view of the inside of the machine of FIG. 1 with the service unit removed from the body's seat.
Figure 3:
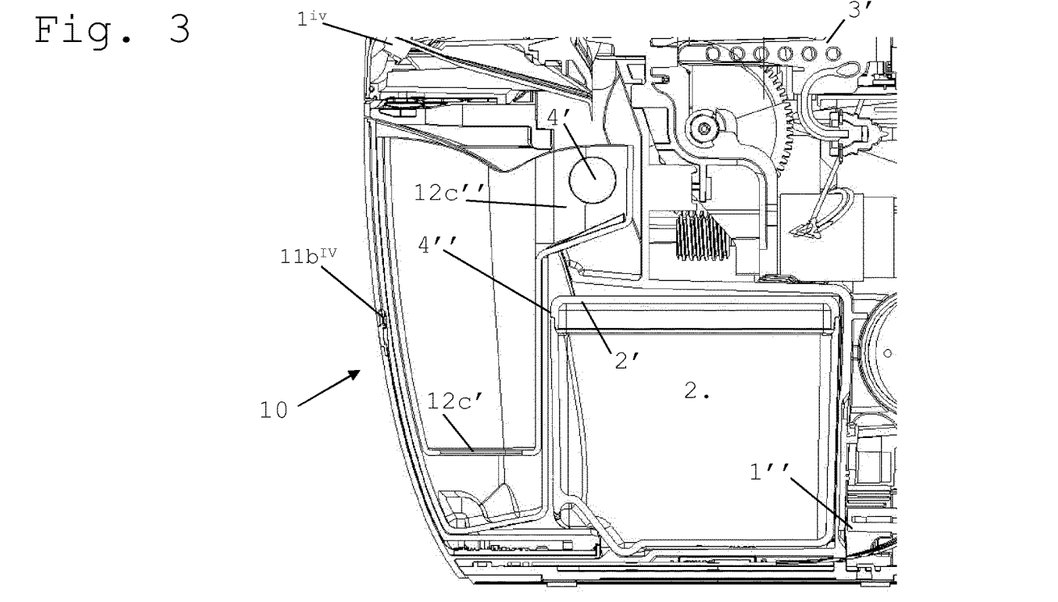
FIG. 3 illustrates in cross-section a part of the machine in the state shown in FIG. 1.
Figure 4:
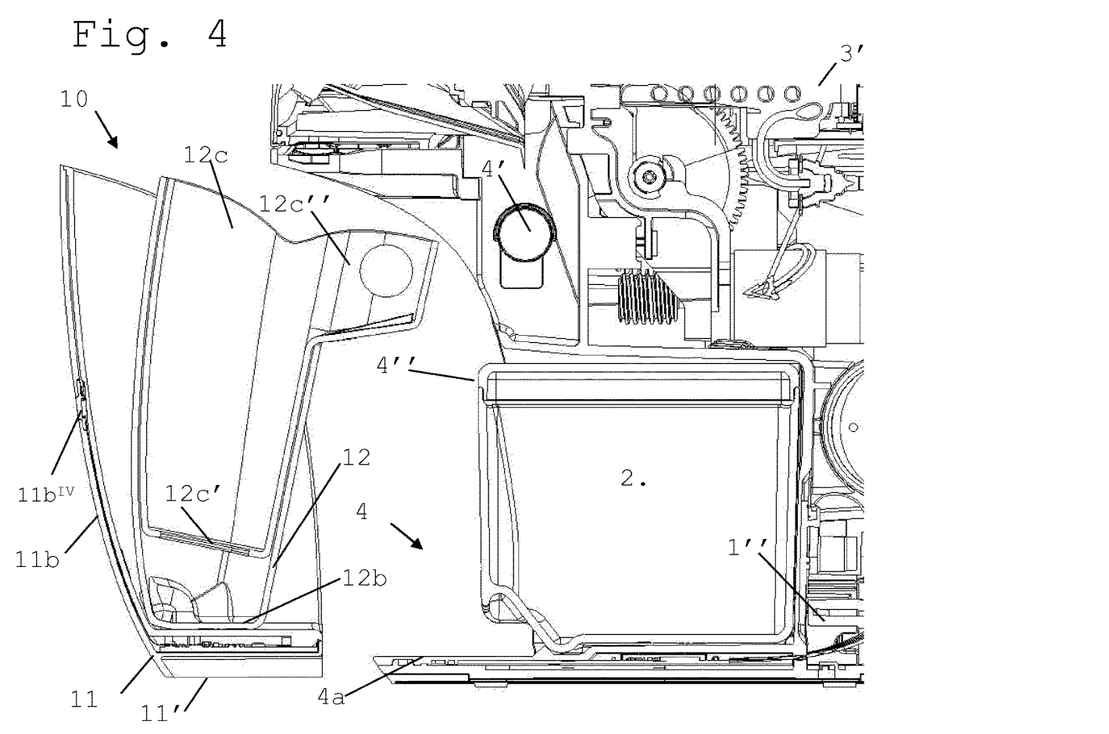
FIG. 4 illustrates in cross-section a part of the machine in the state shown in FIG. 2.
Figure 5:
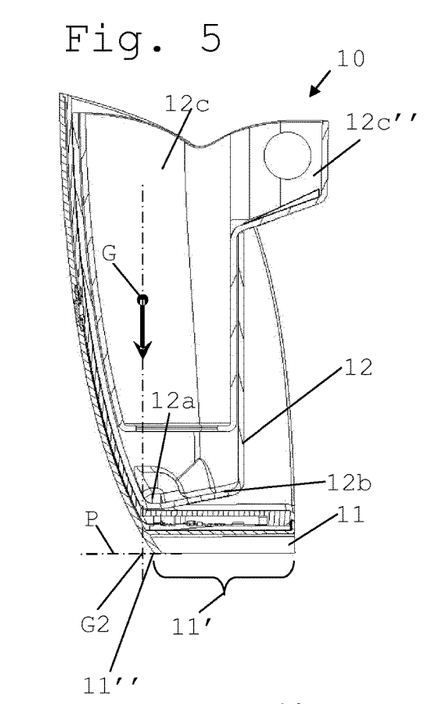
FIG. 5 illustrates in cross-section the service unit having a foot part and a recipient part in the configuration shown in FIG. 1.
Figure 6:
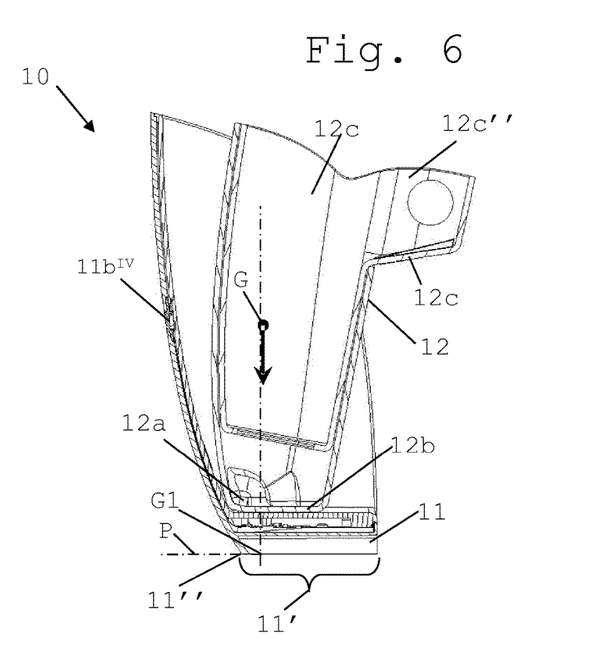
FIG. 6 illustrates in cross-section the service unit having the foot part and the recipient part in the configuration shown in FIG. 2.
Figure 7:
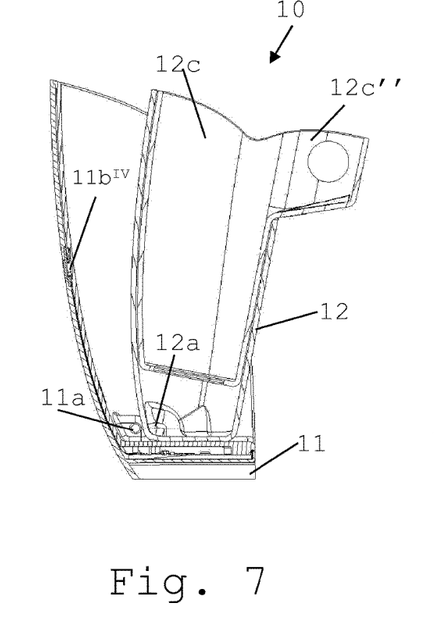
FIGS. 7 and 8 show the removal of the recipient part from a rear side of the foot part of the service unit of FIGS. 1 to 6.
Figure 8:
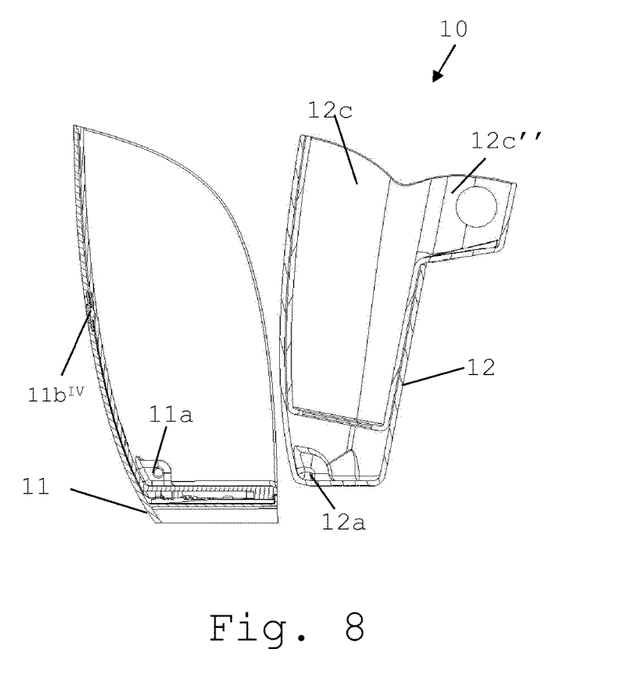
Figure 9:
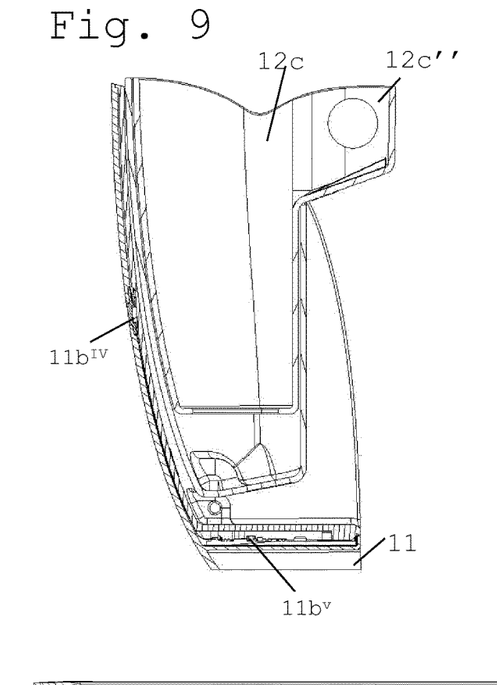
FIGS. 9 and 10 show the insertion from a top of the recipient part into the foot part of the service unit of FIGS. 1 to 6.
Figure 10:
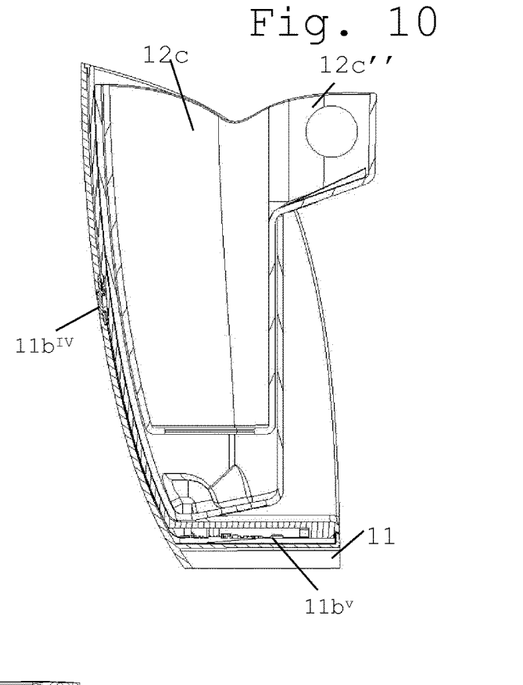
Figures 11, 12:
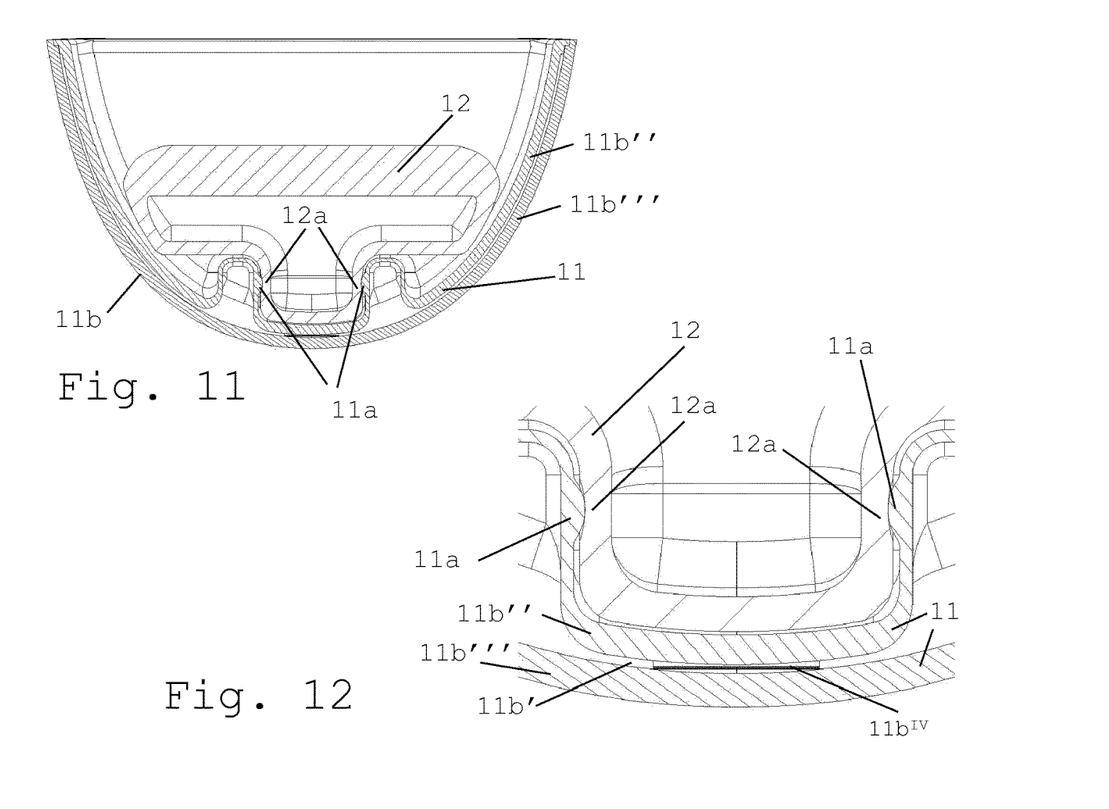
FIG. 11 is a cross-sectional view from above of the recipient part when fastened to the foot part.
FIG. 12 is an enlarged view of the fastening or the recipient part to the foot part as shown in FIG. 11.

See FIGS. 2 and 3.

Beverage processing line 1",1''' can comprise a beverage mixing unit 6 in fluid communication with liquid inlet 1" and beverage dispenser 1'''. For instance, beverage mixing unit 6 has a mixing cavity and an ingredient inlet channel 6' for handling an ingredient to be mixed with liquid. See FIGS. 1 and 2.

Ingredient inlet channel 6' can have an ingredient gate 6" that has a configuration that allows an ingredient to travel to the mixing cavity and a configuration that prevents an ingredient to travel to the mixing cavity. See FIG. 2.

Ingredient inlet channel 6' and a mixing cavity can be configured for handling a preportioned ingredient supplied within an ingredient capsule.

The invention claimed is:

1. A machine for preparing a beverage, the machine comprising:
a body comprising a seat and a beverage processing line extending from a liquid inlet to a beverage dispenser; and
a service unit configured to be removably received in the seat, wherein the service unit comprises a first part and a second removably received in the first part so as to be supported thereby, the first part having a bottom face such that, when the service unit is not received in the seat, the first part is configured to rest on an external horizontal support surface, and wherein the second configured to store un-used beverage ingredient, beverage liquid, cleaning fluid to be supplied to the beverage processing line, used beverage ingredient, waste beverage liquid, or used cleaning fluid collected from the beverage processing line,
wherein, when the second part is received in the first part, the second part is movable relative to the first part between a first position when the service unit rests on the external horizontal support surface and a second position when the service unit is received the seat, the first and second positions being different.

2. The machine of claim 1, wherein the second part is moved into:
the first position by gravity force onto the part and/or a biasing element; and/or
the second position by mechanical resistance of the seat when the second part is urged against a body part delimiting the seat while the service unit is being moved into the seat.

3. The machine of claim 1, wherein, when the first part of the service unit rests on the external horizontal support surface and the second part is received in the first part, a first vertical projection of a centre of gravity of the service unit along a plane containing a boundary of the bottom face is contained within the boundary.

4. The machine of claim 3, wherein, when the service unit is received in the seat, the second part is received in the first part, and the body rests on the external horizontal support surface, a second vertical projection of the centre of gravity of the service unit along the plane containing the boundary of the bottom face is located outside of the boundary of the bottom face or closer to the boundary than the first vertical projection.

5. The machine of claim 1, wherein the second part and the first part are articulated and/or translationally connected, when the second part is received in the first part.

6. The machine of claim 1, wherein the second part is pivotally movable relative to the first part when the second part is received in the first part.

7. The machine of claim 1, wherein the second part is fastened to the first part when the second part is received in the first part.

8. The machine of claim 7, wherein the second part is fastened to the first part by a dismantlable bearing arrangement configured to guide relative movement of the second part and the first part.

9. The machine of claim 7, wherein the first part comprises one or more protrusions that are urged into corresponding recesses of the second part and/or wherein the second comprises one or more protrusions that are urged into corresponding recesses of the first part, and wherein the protrusions and corresponding recesses are relatively movable by translation and/or pivoting to relatively move the first part and the second part.

10. The machine of claim 1, wherein the second part has a bottom face that rests on the first part in the first position and that is at least partly lifted away from the first part in the second position, the bottom face being tilted upwards and/or translated in the second position.

11. The machine of claim 1, wherein the second part contains a removable auxiliary recipient.

12. The machine of claim 1, wherein the service unit is releasably fastened in the seat.

13. The machine of claim 1, wherein the first part comprises an upright wall portion that forms part of an outside machine housing.

14. The machine of claim 1, which comprises a machine tank that is at least one of:
  (i) removably received in the seat when connected to the liquid inlet;
  (ii) fitted with a lid movable or removable for filling the machine tank with liquid; and
  (iii) provided with an outlet connector that is connectible to the liquid inlet, the outlet connector and the liquid inlet.

15. The machine of claim 1, further comprising a liquid dispenser comprising at least one of:
  a beverage outlet;
  a dispensing head that can move inwards into the body for storage and outwards out of the body for dispensing;
  a control unit for controlling the beverage processing line; and
  a user-interface connected to the control unit for controlling the beverage processing line; and/or
  the beverage processing line comprises a beverage mixing unit in fluid communication with the liquid inlet and the beverage dispenser.

16. The machine of claim 7, wherein the second part is fastened to the first part by at least one of a bias, spring, hook, lock and friction mechanism.

17. The machine of claim 11, wherein the removable auxiliary recipient is:
  configured for collecting solid material and that has a bottom with one or more through openings for allowing passage of liquid material from the removable auxiliary recipient to underneath the removable auxiliary recipient to be collected on a bottom of the second part; and/or
  fitted with a handle for seizing the removable auxiliary recipient to remove the removable auxiliary recipient from the second part.

18. The machine of claim 13, wherein the part of the outside machine housing is an upright wall portion covering the seat.

19. The machine of claim 14, wherein the machine tank is insertable into or onto the seat and removable from the seat providing the service unit has been removed from the seat.

20. The machine of claim 15, wherein the beverage mixing unit comprises a mixing cavity and an ingredient inlet channel for handling an ingredient to be mixed with liquid.

* * * * *